ABSTRACT: An apparatus is disclosed for testing photographic images by producing a strip of exposures for different time intervals. The structure incorporates a timing circuit for manifesting discrete time intervals and mechanism for moving a test sheet of photosensitive paper under an exposure window to provide different intervals of exposure.

United States Patent [11] 3,529,522

[72] Inventor Gerald R. Dunn
4513 Ethel Ave., Studio City, California 91604
[21] Appl. No. 541,908
[22] Filed March 22, 1966
[45] Patented Sept. 22, 1970

[54] PHOTOGRAPHIC ENLARGER EXPOSURE COMPARATOR USING TEST STRIPS
3 Claims, 5 Drawing Figs.

[52] U.S. Cl. .................................................. 95/10, 355/68, 355/83
[51] Int. Cl. ................................................... G01j 1/52
[50] Field of Search ...................................... 95/10, 75; 88/24; 355/68, 83

[56] References Cited
UNITED STATES PATENTS

| | | | |
|---|---|---|---|
| 1,901,186 | 3/1933 | Norworth | 95/10(A)UX |
| 2,212,834 | 8/1940 | Kalish | 95/10 |
| 2,227,987 | 1/1941 | Tuttle | 88/24 |
| 2,258,994 | 10/1941 | Merriman | 88/24 |
| 2,369,981 | 2/1945 | Reyniers | 88/24 |
| 2,690,696 | 10/1954 | Ashton | 88/24 |
| 2,795,168 | 6/1957 | Bauer | 88/24 |
| 2,855,834 | 10/1958 | Doster | 95/75 |

Primary Examiner—John M. Horan
Attorney—Nilsson, Robbins, Wills and Berliner

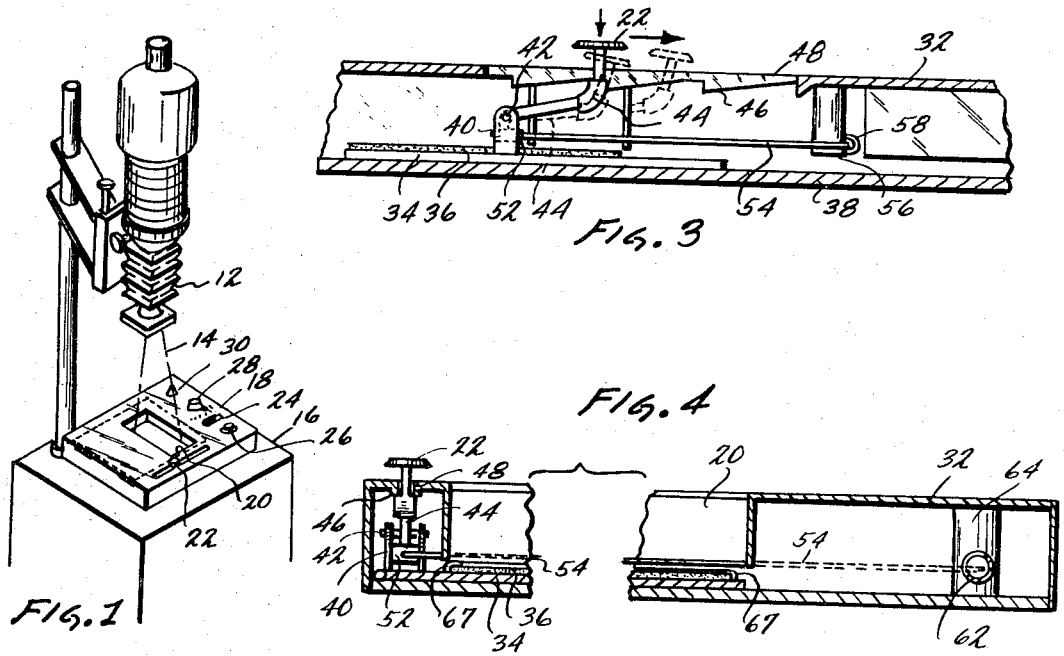
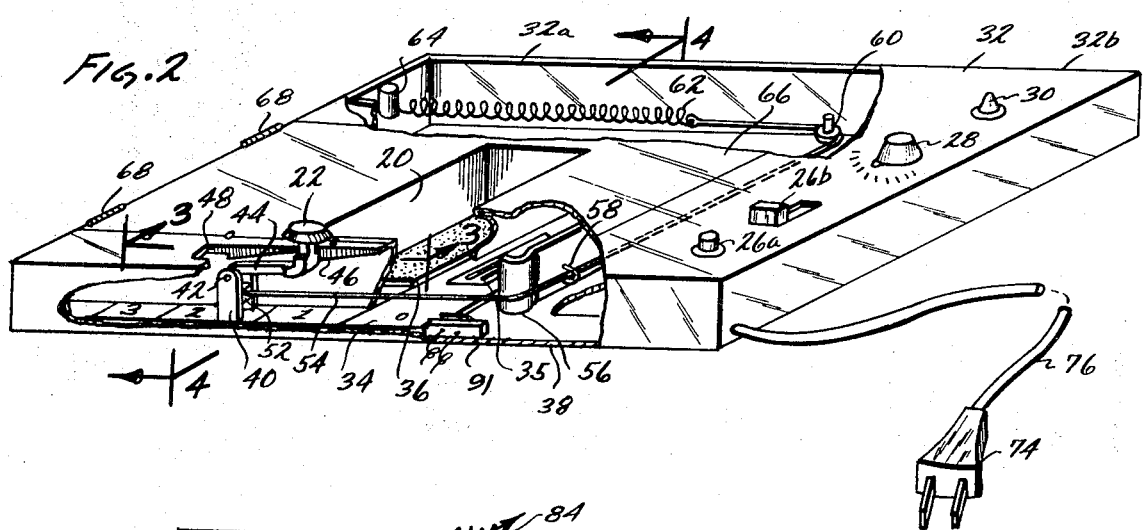
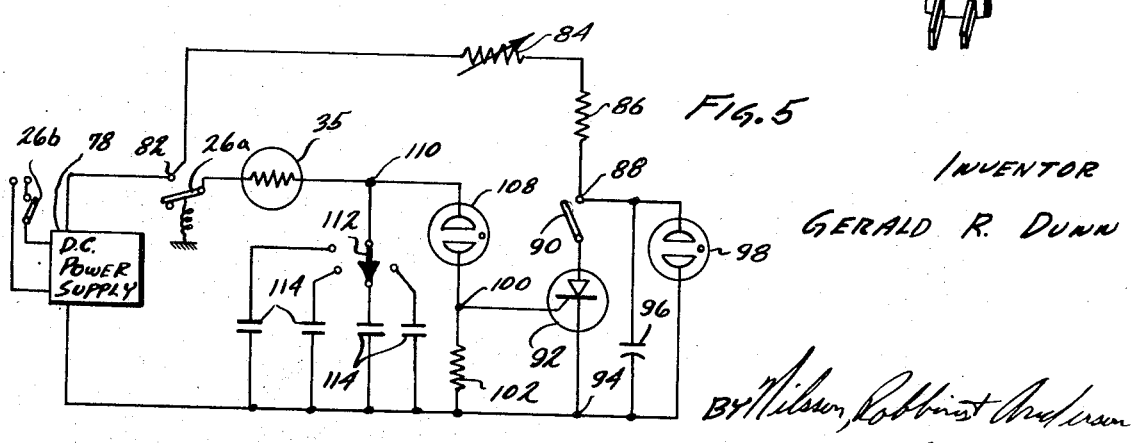

PHOTOGRAPHIC ENLARGER EXPOSURE COMPARATOR USING TEST STRIPS

The present invention relates to a system for use in photographic processing, and more particularly to such a system for producing photographic sample prints at various exposure periods for use in artistically and accurately determining a desired exposure period.

A variety of techniques and appliances have been used in the past for determining the period of exposure for producing a particular photographic enlargement or other reproduction. For example, one technique that has been widely used progressively involves providing a sequence of test exposures by subjecting areas of a test sheet of photo-sensitive paper to a light image. Upon developing the sheet, the resultant exposures can be analyzed with the hope of determining the desired exposure. In spite of the widespread use of this technique, there are certain attendant problems. For example, each of the exposed areas or samples is a reproduction of a different part of the photographic image and as a result, comparison between exposures is frequently difficult. That is, in the common example of printing a portrait, a comparison may be required between one exposure period exemplified by a facial area and another exposure period representing a background area. Such comparisions are difficult and as a result, it is frequently necessary to make additional test strips or sample-exposure sheets to arrive conclusively at a desired exposure period. Even in somewhat ideal situations, this technique is time-consuming and laborious.

Another system that has been employed to arrive at a desired exposure period involves the use of photo-electric sensor devices in cooperation with computing apparatus to sense certain extreme areas of the projected light image and compute therefrom the desired period of exposure. These systems are quite satisfactory in commercial and other high-production facilities; however, automated systems of this type are of course quite expensive and furthermore must be calibrated for precise production conditions. That is, variations in photographic paper, temperature, solution age, and various other criteria become critical with respect to a particular calibration of the exposure determining system. As a result, these systems are quite impractical for use by amateur photographers or in commercial laboratories of limited production. Furthermore, these systems do not permit the exercise of artistic choice but simply provide mechanical determinations.

In view of the vast amount of photographic activity performed by amateurs and others in relatively-low production laboratories, a need exists for an inexpensive system for determining the desired exposure period for an enlargement or other reproduction, which system may be employed to arrive at a desired exposure period in a relatively-short time while allowing the exercise of some artistic discretion.

It is therefore an object of the present invention to provide an improved system for determining the exposure interval that is desireable in a specific photographic reproduction operation.

Another object of the present invention is to provide an improved apparatus for exposing different areas of a photo-sensitive test sheet to a particular portion of a light image, during different time intervals to provide readily-comparable test results and thereby determine a desired exposure interval.

One other object of the present invention is to provide an improved timing system for use in cooperation with an exposure apparatus, which combination can be manufactured inexpensively and may be effectively employed with convenience and ease to arrive at a desired exposure time as in photographic processing.

Still another object of the present invention is to provide a simple system for determining the proper exposure of a photo-sensitive medium to a light image during photographic reproduction, which system senses the intensity of the light image to provide an electrical signal for indicating an approximation of the proper exposure period, and which system further incorporates means for exposing a test sheet of photo-sensitive medium to a select area of the light image during different periods to provide a basis for a final determination of the critical period.

One further object of the present invention is to provide an improved process for determining the proper exposure period for a sheet of photo-sensitive medium to a light image in order to obtain desired results.

Still one further object of the present invention is to provide an improved and relatively simple apparatus for rapidly providing a range of positive visual exposures which may be considered with artistic appraisal for determining the desired period of exposure.

These and other objects and advantages of the present invention will become apparent from a consideration of the following taken in conjunction with the drawings appended hereto; wherein:

FIG. 1 is a perspective view illustrating use of an apparatus incorporating the present invention and showing such apparatus somewhat enlarged in relation to illustrated environmental structure;

FIG. 2 is a sectional and perspective view of a portion of the apparatus of FIG. 1;

FIG. 3 is a sectional view taken along line 3—3 of FIG. 2;

FIG. 4 is a sectional view taken along line 4—4 of FIG. 2; and

FIG. 5 is a circuit diagram of electrical system embodied in the structure of FIG. 2.

Referring now to FIG. 1, there is shown an enlarger 12 for receiving a photo-negative (not shown) and projecting a light image 14 onto an easel table 16. Shown positoned upon the easel table 16 is an exposure apparatus or appliance 18 illustrated somewhat enlarged in relation to the other structure so as to be adequately presented. The appliance 18 is of generally parallelepiped configuration and includes a window 20 through which a portion of the light image 14 is passed. The portion of the light image so passed may impinge upon either various areas of a photographic test sheet, or upon a photo-electric device, depending upon the position of a sliding pushbutton 22. The photo-electric apparatus and related circuit is controlled by toggle switch 24, a momentary-contact timing switch 26, and a calibration on-off knob 28 all of which will be described structurally and functionally below. Signal manifestations are provided from the electrical circuit in the system by flashes of a bulb 30.

Considering the operation of the system in a preliminary way, a photo-negative is set within the enlarger 12 to provide the light image in focus at the bottom of the window 20. Next, a sheet of photo-sensitive test medium is placed in the appliance 18 and the pushbutton 22 is set to expose a photo-electric device therein to a portion of the light image. Depending on the light intensity, the bulb 30 flashes appropriately to indicate an approximate exposure period measured by the number of flashes. When the flashes stop, the operator actuates the pushbutton 22 to place the first section of the photo-sensitive sheet in the window 20 which is then exposed during a period measured by one or two less flashes than the number of flashes indicated during the initial stage. In this regard, during this phase of operation, the bulb 30 automatically flashes to indicate regular intervals coinciding to the intervals between flashes during the initial timing operation. However, the flashing is not terminated after an interval but continue indefinitely. Therefore, the operator simply counts less than those of the initial timing period.

At the conclusion of the first measured exposure interval the pushbutton 22 is actuated to move a second section of the photo-sensitive sheet into the window. The second section is exposed for a period coinciding to the initial timing period by counting flashes of the bulb 30. Next, the pushbutton 22 is again depressed to position a third section of the photo-sensitive sheet in the window which is exposed during a period increased by one or two flash intervals.

At the conclusion of these exposure periods, the photo-sensitive sheet is removed and developed to provide three images indicative of three exposure levels from which an artistic determination of exposure time can be concluded. Thus, the operator is afforded flexibility and positive results.

To pursue the illustrative structure in greater detail, the appliance 18 incorporates a housing 32 (FIG. 2) which contains a slidable frame 34. The frame 34 carried in the window section 32a of the housing 32 while the electronic components of the timing circuit are housed in the separate section 32b. The frame 34 is somewhat arbitrarily divided into four strips or areas identified as areas 0, 1, 2, and 3. The area 0 carries a photo-electric device 35 as a Cds cell while the areas 1, 2, and 3 commonly receive a test sheet of photo-sensitive paper 36. The relative movement of the frame 34 within the housing 32 provides the various areas 0, 1, 2 or 3 exposed through the window 20 in accordance with similar indicated positions of the button 22. The window 20 is rectangular in form and somewhat centrally defined within the housing 32. The movement of the frame is accomplished by a spring and ratchet structure controlled by the pushbutton 22 as will now be considered.

The housing 32 essentially defines a rectangular box with the centrally-located aperture or window 20 extending toward a floor 38 (FIG. 3) along which the frame 34 slides. A pair of closely-spaced upright supports 40 at the edge of the frame 34 receive a pivot pin 42 which carries a pawl 44. The pawl extends to engage the teeth of a linear ratchet 46 that is formed in the interior of the housing 32. The pawl 44 terminates in a pushbutton 22 which extends through a slot 48 in the top of the housing 32 at the side of the ratchet 46. Thus, a shoulder 50 on the pawl 44 engages the teeth of the ratchet 46 to lock the frame 34 against further movement to the right as it is urged by spring force.

The frame 34 is urged to the right by a spring which also acts to set the pawl 44 into the ratchet 46. Specifically, a downward extension 52 integral with the pawl 44 from the pivot pin 42 is connected to a line 54 of flexible material, which extends about a corner ridge 56 (FIG. 2) then transversely passes through guides 58, about a pulley 60 (for another change of direction) and extends to receive a coil spring 62. An anchor 64 holds the other end of the coil spring so that as the frame 34 is displaced to the left, (as shown in FIG. 2) the coil spring 62 is stressed to urge the frame 34 to the right.

Further structural details of the appliance 18 may now best be presented by considering the operation of inserting a sheet of test paper 36 in the unit and describing the displacement thereof under the window 20. Initially, the pushbutton 22 is depressed and translated to be set at the first position 1 as shown in FIG. 2. Next, the housing 32 is opened by lifting the hinged section 66, containing the window 20, which section is carried on hinges 68 that may include springs to urge the section closed. As a result, the frame 34 is accessible and the sheet of paper 36 is placed thereon, held by edge channels or lips 67 (FIG. 4). In closing the section 66 of the housing 32, down on the paper, it is to be noted that the walls of the window 20 as well as the other structure in the housing 32 hold the paper 36 flat on the frame 34. This loading operation is performed with a safe light so as not to prematurely expose the paper 36.

Prior to considering an actual exposure sequence, it is desirable to provide a preliminary understanding of the electrical system as shown in FIG. 5 which is contained in section 32b of the housing 32. The system is powered by a.c. electrical energy, applied through a plug 74 (FIG. 2) a cord 76 and an on-off switch 26b (FIG. 5) to a d.c. power supply 78. The positive side of the power supply 78 is connected through a terminal 82, a variable resistor 84 and a fixed resistor 86 to a terminal 88. The terminal 88 may be engaged by a movable switch contact 90 for connection of the terminal 88 to a silicon controlled rectifier 92 which is in turn connected to a negative bus 94 connected to the d.c. power supply 78. The switch contact 90 is physically embodied in a miniature switch 91 (FIG. 2) which senses the position of the frame 34. When the frame 34 is in position 0, exposing the photo-electric device 35 in the window 20, the switch 91 causes the electrical system to manifest an interval indicative of the light intensity in the window 20. Other positions are sensed by the switch 91 to cause the electrical system to function as a clock or timer to indicate regular timed intervals.

Returning to the structure of the electrical system the terminal 88, also incorporated in the switch 91 is connected to the negative bus 94 (FIG. 5) through a capacitor 96 and a parallel gas tube 98. The control electrode of the controlled rectifier 92 is connected to a junction point 100 which is connected to the negative bus 94 through a resistor 102. Connection is also made to the junction point 100 from the terminal 82, through the momentary-contact pushbutton switch 26b, the photo-resistance device 35, and a gas tube 108. The junction 110 between the element 106 and the gas tube 108 is connected to a movable contact of a switch 112, the fixed contacts of which are connected to a plurality of capacitors 114 which are in turn connected to the negative bus 94.

It is to be noted, that the pushbutton 26a (FIG. 2) controls the switch 104 while toggle 26b controls the off-on switch 104 (FIG. 5). The knob 28 (FIG. 2) controls the position of the movable contact 112 to select an operative capacitor in the circuit. The bulb 30 (FIG. 2) is provided timing flashes by the gas tube 98 (FIG. 5) which is mounted thereunder or integral therewith.

The circuit of FIG. 5 functions in a dual capacity, i.e. as a continually-operating timing circuit in which the gas tube 98 flashes at regular periods, or alternatively, to indicate an interval indicative of the illumination recieved by the photo-sensitive device 35, by providing a related number of timed flashes from the gas tube 98. When the system is to merely provide timed flashes over a continuous period, the on-off switch 26b is closed resulting in the application of power from the supply 78 through the resistors 84 and 86 across the capacitor 96 and the tube 98. The resistors 84 and 86 function in cooperation with the capacitor 96 as an RC timing circuit developing an increasing charge across the capacitor 96. When the charge on the capacitor 96 is sufficient to break down the gas tube 98, the tube flashes discharging the capacitor 96 then the cycle is repeated. Of course, the interval of this period can be controlled somewhat by the variable resistor 84; however, the interval once established at some period, e.g. one second, will normally be held at that period.

In altering the operation to provide an indication of light intensity the switch contact 90 is engaged to the terminal 88 by setting the photo-electric device 35 in the window 20, then immediately after a flash by the tube 98, the switch 26a is closed to supply power to the photo-electric device 35 which has thus been given a brief interval to stabilize. As a result, a charging current passes through the photo-electric device 35 to an operative capacitor 114 (depending on the position of the switch 112) which capacitor begins charging at a rate dependent upon the illumination impinging upon the device 35. During the charging interval the tube 98 continues flashing as previously described. That is, the charging period of the capacitor 96 is considerably less than that of the operating capacitor 114 so that the plural flashes of the tube 98 actually time the interval of charging the capacitor 114.

When the charge on the operating capacitor 114 reaches a predetermined level, the gas tube 108 breaks down providing a voltage at the junction point 100 which develops a signal to trigger the controlled rectifier 92 causing it to conduct and thereby shorting the capacitor 96. Thus the number of flashes by the gas tube 98 indicate the time required for the charge on the capacitor 114 to become adequate to break down the gas tube 108. Of course, the charging rate of the capacitor is dependent upon the intensity with which the photo-electric element 35 is illuminated; therefore, the number of flashes provided by the gas tube 98 directly indicates the intensity of illumination of the photo-electric element 35.

The complete operation of the system may now be best understood by assuming the appliance is loaded with a sheet of photo-sensitive paper 36, and that the enlarger 12 is prepared to project the light image 14 of which a reproduction is to be produced. The next operation is to depress the translating button 22 (FIG. 2) and return it to the 0 position so that the photo-electric device 35 is removed from its sheltered location to be positioned in the window 20. It is to be noted, that normally the photo-electric device 35 is shielded from light by dwelling under the housing 32 and is therefore ready to operate without a recovery period.

In the position 0, the movable contact 90 engages the terminal 88; however, the controlled rectifier 92 is not conductive, therefore, no current flows through the contact 90. Therefore current flow from the terminal 88 charges the capacitor 96, periodically breaking down the tube 98 to produce a flash. Immediately after such a flash, the switch contact 26a is closed establishing a current to charge the operative capacitor 114 which current varies in accordance with the intensity of illumination provided on the photo-electric device 35. In this regard, it is to be noted, that the window 20 containing the photo-electric device is set to receive a rather critical part of the projected light image, e.g. the eyes or the like including a part of the face.

After the switch contact 26a is closed, the operator counts the flashes of the tube 98 as indicated through the bulb 30 (FIG. 2) which will vary in number depending upon the intensity of illumination falling upon the photo-electric device 35. Assume for example that after eight flashes of the tube 98, the operative capacitor 114 has charged sufficiently to break down the tube 108 with the result that a voltage is established across the resistor 102 to supply a signal that turns on the controlled diode 92. As a result, the charging current previously supplied to the capacitor 96 is now shorted through the control diode 94 with the result that no further flashing of the tube 98 occurs. Therefore, the operator is informed that eight flashes of the lamp 98, manifests eight seconds for example as the proper time for exposure of a photo-sensitive paper to the projected image 14. However, that time is not a final determination.

The operator next depresses the pushbutton 22 (FIG. 2) to translate it to position 1 setting area 1 of the photo-sensitive paper 36 in the window 20. Simultaneously with the placement of the area 1 in the window 20 the displacement of the frame 34 opens the switch 91 so that the capacitor 96 (FIG. 5) resumes charging cycles to repeatedly breakdown the tube 98. The operator counts the flashes of the tube 98 and upon the occurrence of six flashes (two less than the metered number) the button 22 is again depressed permitting the spring 62 to pull the next area, i.e. area 2 of the paper 36 into the window 20. That area is exposed for eight counts after which the paper on area 3 is exposed for ten counts. Of course, the increments may vary to different numbers of counts. At the conclusion of these exposures the enlarger 12 is turned off and the paper 36 removed for processing. Of course, this is accomplished simply by lifting the hinged-mounted section 66 of the housing to remove the paper and thereafter performing conventional processing operations.

At the conclusion of the processing operation, the operator has three test exposures, all of which are of the same photographic image, one of which should be precisely correct for the enlargement he desires.

Calibration may be accomplished in accordance with the type of paper employed, etc. by moving the knob 28 to select different capacitors 114. As a result, the system permits rapid operation, flexibility within limits, and is relatively inexpensive to use while not requiring a high degree of skill.

The unit as described may be variously manufactured, as from molded plastic. In this regard, the housing 32 may be molded in components which are assembled about a similarly formed frame 34. Of course, the electrical components may take any of a wide variety of different forms that are variously housed within the section of the housing 32 provided.

It is of course apparent that a wide variety of different forms of the structure may be manufactured; therefore, the scope hereof is not to be limited in accordance with the prescribed embodiment but rather shall be determined in accordance with the claims set forth below.

I claim:

1. A photographic appliance for printing a sequence of test exposures on a sheet of photo-sensitive medium, comprising:
   a frame for receivably supporting said means defining a window, mated with said frame;
   means for stepping said frame relative to said window whereby plural areas of said photo-sensitive medium are sequentially exposed through said window;
   a photo-electric device affixed to said frame whereby to be positioned within said window; and
   electrical means including a time charging circuit to manifest a number of perceivable counts, said electrical means connnected to said photo-electric device for manifesting the intensity of illumination through said window.

2. An appliance according to claim 1 wherein said frame is slidably affixed to said means defining a window and wherein said means for stepping comprises spring means fixed between said frame and said means defining a window and step release means for releasably locking said frame against movement relative said means defining a window.

3. An appliance according to claim 1 wherein said step release means comprises a linear stepped rack defined in said means defining a window and a pawl affixed to said frame whereby to engage said stepped rack.